United States Patent [19]

Kasori et al.

[11] Patent Number: 5,284,537
[45] Date of Patent: Feb. 8, 1994

[54] METHOD OF MANUFACTURING ALUMINUM NITRIDE STRUCTURE WITH ANISOTROPIC PROPERTIES

[75] Inventors: Mitsuo Kasori; Akihiro Horiguchi, both of Kawasaki; Yoshiko Goto, Tokyo; Fumio Ueno, Yokohama, all of Japan

[73] Assignee: Kabushiki Kaisha Toshiba, Kawasaki, Japan

[21] Appl. No.: 988,666

[22] Filed: Dec. 10, 1992

Related U.S. Application Data

[62] Division of Ser. No. 545,691, Jun. 29, 1990, Pat. No. 5,204,080.

[30] Foreign Application Priority Data

Jun. 30, 1989 [JP] Japan .................. 1-166875

[51] Int. Cl.⁵ .............................. C04B 37/00
[52] U.S. Cl. ........................ 156/89; 156/325
[58] Field of Search ........... 156/89, 325; 264/60

[56] References Cited

U.S. PATENT DOCUMENTS

| | | | |
|---|---|---|---|
| 4,719,187 | 1/1988 | Bardhan et al. | 501/97 |
| 4,756,976 | 7/1988 | Komeya et al. | 428/698 |
| 4,800,137 | 1/1989 | Okuno et al. | 156/89 |
| 4,892,703 | 1/1990 | Iio et al. | 419/13 |
| 5,006,491 | 4/1991 | Ueda et al. | 501/96 |
| 5,063,121 | 11/1991 | Sato et al. | 156/89 |
| 5,096,863 | 3/1992 | Fukushima | 156/89 |

OTHER PUBLICATIONS

Toshiba Review 44[8]1989; A. Horiguchi et al; "Development of High-Thermal Conductivity Aluminum Nitride Ceramics", pp. 616-618 Only Abstract Translated.
Journal of Materials Science Letters 3(1984), N. Kuramoto et al; "Transparent AlN Ceramics", pp. 471-474.

*Primary Examiner*—Jan H. Silbaugh
*Assistant Examiner*—Christopher A. Fiorilla
*Attorney, Agent, or Firm*—Oblon, Spivak, McClelland, Maier & Neustadt

[57] ABSTRACT

In an aluminum nitride structure, a plurality of aluminum nitride regions having different purities are integrally formed to satisfy a predetermined positional relationship, and neighboring regions are brought into direct contact with each other to form an abrupt junction therebetween. Therefore, the aluminum nitride structure has anisotropy in physical properties such as a thermal conductivity, a light transmittance, and a strength.

6 Claims, 2 Drawing Sheets

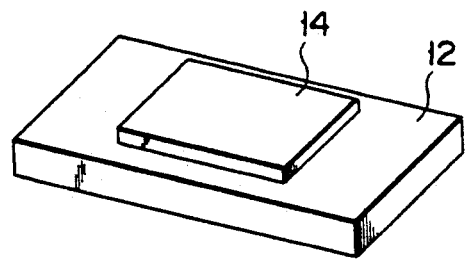
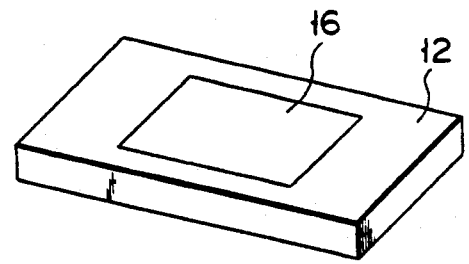
FIG. 1
FIG. 2
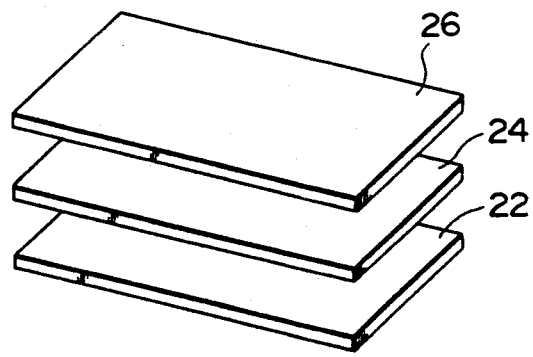
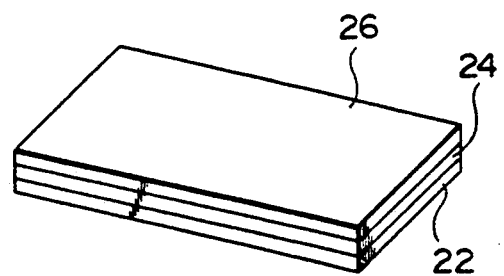
FIG. 3
FIG. 4

METHOD OF MANUFACTURING ALUMINUM NITRIDE STRUCTURE WITH ANISOTROPIC PROPERTIES

This is a division of application Ser. No. 07/545,691 filed Jun. 29, 1990, now U.S. Pat. No. 5,204,080.

BACKGROUND OF THE INVENTION

1. Field of the Invention

The present invention relates to an AlN structure having anisotropy in physical properties such as a thermal conductivity, a light transmittance, and a strength and a method of manufacturing the same.

2. Description of the Related Art

Aluminum nitride (AlN) has a high strength at temperatures from a room temperature to higher temperatures, an excellent corrosion durability and a good thermal shock resistance, is not wet with a molten metal, and has a high insulation performance and a high thermal conductivity, i.e., has many good properties. An AlN ceramics having particularly good properties of such AlN can be obtained by a manufacturing method disclosed in, e.g., Published Unexamined Japanese Patent Application No. 60-127267.

An AlN ceramics obtained by the above manufacturing method has isotropy in various physical properties. In recent years, however, a demand has arisen for a practical AlN structure having anisotropy in various physical properties. In order to satisfy such a demand, Published Unexamined Japanese Patent Application No. 60-73843 discloses an AlN structure having thermal conductivity anisotropy. Since, however, this AlN structure is obtained by integrating AlN and an Al-O-N-system or Al-Si-O-N-system compound, good properties of AlN have not been satisfactorily utilized.

That is, a high thermal conductivity as an essential property of AlN is degraded. In addition, the resistance of the Al-O-N-system or Al-Si-O-N-system compound is degraded in severe environments such as high temperatures or metal vapors, and degradation progresses due to corrosiveness. Therefore, this AlN structure cannot be used under such conditions.

Published Unexamined Japanese Patent Application No. 64-89546 discloses a semiconductor device having a package portion obtained by bonding a member consisting of high-purity white AlN and a member consisting of low-purity black AlN obtained by decreasing a purity by adding a transition metal. In this structure, the two members having different purities are bonded by brazing or an active metal method. Therefore, a layer consisting of a substance except for AlN is formed between the two members. This is because the structure aims at protecting a semiconductor chip inside the package portion and therefore the bonding between the two members is formed in consideration of only ease in manufacturing and a bonding strength.

As described above, AlN is not used in all portions in conventional AlN structures. Therefore, since a portion consisting of a material except for AlN degrades the properties of the AlN structures, the good properties thereof are not satisfactorily utilized.

SUMMARY OF THE INVENTION

It is, therefore, an object of the present invention to solve the above conventional problems and provide an AlN structure having anisotropy in physical properties such as a thermal conductivity, a light transmittance, and a strength while maintaining its essential properties, e.g., heat and corrosion resistances and a method of manufacturing the same.

In order to achieve the above object, in an AlN structure according to the present invention, a plurality of AlN regions having different purities are formed integrally with each other to satisfy a predetermined positional relationship, and neighboring regions are brought into direct contact with each other. With this arrangement, anisotropy is imparted to physical properties such as a thermal conductivity, a light transmittance, and a strength.

In a first manufacturing method according to the present invention, an oxygen trapping substance is placed at a predetermined position on an AlN substrate, and the substrate is heated in a reducing atmosphere to increase a purity in an AlN region on which the oxygen trapping substance is placed, thereby forming an AlN structure as described above.

In a second manufacturing method according to the present invention, a plurality of AlN ceramics substrates having different purities are combined and resintered to be integrated, thereby forming the above AlN structure.

In the present invention, the purity of each AlN region is defined by amounts of, e.g., solid solution oxygen in an AlN grain present in the AlN region, a transition metal contained in the AlN region, and pores in the region. The AlN structure of the present invention, therefore, is constituted by integrating a plurality of AlN regions in each of which at least one of an oxygen content in an AlN grain, a transition metal content in the AlN region, and a porosity in the AlN region is different from that of the other regions. In the AlN region, values of a thermal conductivity, a light transmittance, a strength, and the like are changed each time the purity defined as described above is changed. Therefore, in the AlN structure according to the present invention, anisotropy can be imparted to the physical properties.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 and 2 are perspective views showing a method of manufacturing an AlN structure according to the present invention;

FIGS. 3 and 4 are perspective views showing another method of manufacturing an AlN structure according to the present invention;

DETAILED DESCRIPTION OF THE PREFERRED EMBODIMENTS

Figure 5:
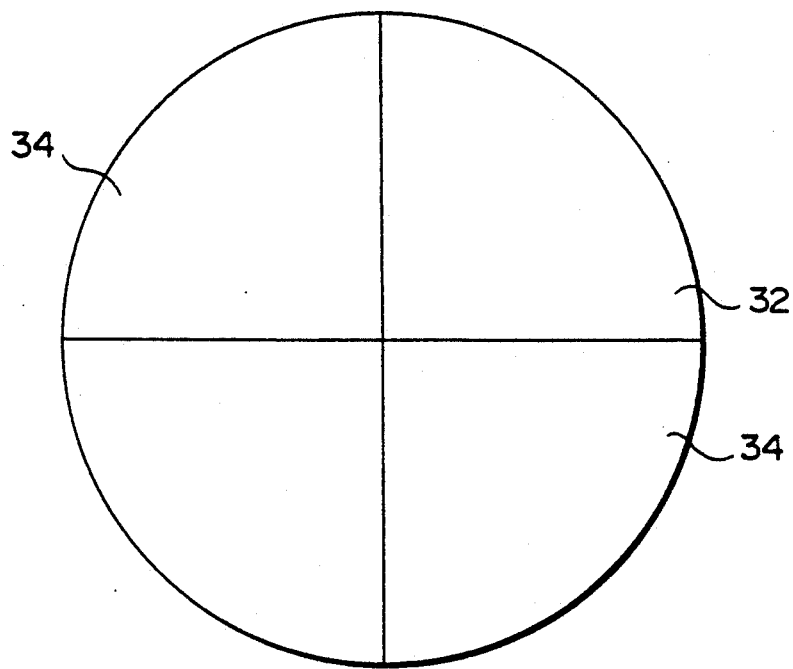
FIG. 5 is a plan view showing an AlN ceramics substrate on which an oxygen trapping substance is coated.

As an AlN raw material for use in an AlN structure of the present invention, an AlN ceramics is preferable since it has particularly good properties. Therefore, an AlN structure obtained by integrating a plurality of AlN ceramics regions having different purities to satisfy a predetermined positional relationship will be described in detail below.

In the AlN structure according to the present invention as described above, values of various physical properties are determined by the purities defined as described above in a plurality of AlN ceramics. An oxygen content in an AlN grain has a correlation with a thermal conductivity of an AlN ceramics. That is, if the oxygen content is small, the thermal conductivity is increased. If the oxygen content is large, the thermal conductivity is decreased. A transition metal content of an AlN ceramics has a correlation with the thermal conductivity and light transmittance. That is, if the transition metal content is small, the thermal conductivity and the light transmittance are increased. In addition, a porosity of an AlN ceramics has a correlation with the thermal conductivity and a strength of an AlN ceramics. That is, if the porosity is small, the thermal conductivity and the strength are increased. If the porosity is large, the thermal conductivity and the strength are decreased.

Anisotropy, therefore, can be imparted to a thermal conductivity and a light transmittance by integrating AlN ceramics regions having different oxygen contents in AlN grains or AlN ceramics regions having different transition metal contents in AlN ceramics. When ceramics regions having different porosities in AlN ceramics are integrated, anisotropy is imparted to a thermal conductivity and a strength.

It is more preferable to control the oxygen content, the transition metal content, the porosity, and the like as described above in consideration of, e.g., an application of the AlN structure. The purity of an AlN ceramics, however, must be set so that essential properties of an AlN ceramics, e.g., heat and corrosion resistances are not degraded. The transition metal content in an AlN ceramics is preferably 40 wt % or less, and its porosity is preferably 40 vol % or less.

In order to obtain an AlN ceramics according to the present invention, a sintering aid containing an alkali earth element or a rare earth element is used as needed. In this case, an AlN structure of the present invention may contain a residual component caused by the sintering aid. Examples of the residual component are an R-Al-O-system compound (wherein R represents an alkali earth element), an Ln-Al-O-system compound (wherein Ln represents yttrium (Y) or a rare earth element), and an Ln-R-Al-O-system compound.

The purity of an AlN ceramics may be changed by changing an addition amount of the above Ln element upon sintering of the AlN ceramics. Preferable component examples of a transition metal for obtaining anisotropy in physical properties as described above are Ti, and Zr. In addition to the residual components of the sintering aid as described above, the AlN structure of the present invention may contain an Al-O-N-system compound such as $Al_{(8/3+X/3)}O_{4-x}N_x$ or $Al_9O_3N_7$ (27R poly type) caused by oxygen in an AlN grain.

Although the AlN structure of the present invention using an AlN ceramics as an AlN raw material has been described in detail above, the present invention is not limited to the above embodiment. For example, the AlN region may be an AlN thin film or the like formed on a substrate by, e.g., sputtering.

A method of manufacturing the AlN structure according to the present invention will be described below with reference to FIGS. 1 and 2.

The AlN structure of the present invention is obtained by placing an oxygen trapping substance 14 at a predetermined position on an AlN substrate 12 as shown in FIG. 1, heating the substrate in a reducing atmosphere, and increasing a purity of AlN in a region 16 in which the oxygen trapping substance is placed. This manufacturing method can be particularly suitably applied to the manufacture of an AlN structure obtained by integrating a plurality of AlN regions having different oxygen contents in AlN grains to satisfy a predetermined positional relationship.

The above method of manufacturing the AlN structure according to the present invention is based on the following findings of the present inventors. That is, upon heating, as described above, a reaction progresses between the AlN substrate 12 and the oxygen trapping substance 14 placed at a predetermined position on the substrate 12. In the present invention, the oxygen trapping substance 14 means a substance having a function of reacting with the AlN substrate 12 when it is heated together with the AlN substrate 12 and trapping solution oxygen in AlN grains. By this reaction, oxygen contained in AlN grains is trapped in the oxygen trapping substance 14 to increase the purity of the AlN region on which the oxygen trapping substance 14 is placed. At this time, the purity of AlN is increased not in a horizontal direction but in only a vertical direction from the contact surface between the AlN substrate 12 and the oxygen trapping substance 14. That is, since the purity is increased inwardly in the AlN substrate 12 with almost no blur, a portion in which a purity is to be increased in the AlN substrate 12 can be controlled by a position of the oxygen trapping substance 14. Therefore, the AlN structure according to the present invention in which an oxygen content is small at a predetermined position in the AlN substrate 12 can be obtained.

As the oxygen trapping substance, any known sintering aid conventionally added upon sintering of an AlN ceramics to trap oxygen contained in an AlN powder as a starting material can be directly used. Examples of the sintering aid are an oxide, a fluoride, a carbide, and a nitride of the R or Ln element described above, and compounds which can be changed into the above compounds upon sintering. In the present invention, although a powder of the above sintering aid can be directly used as the oxygen trapping substance, a molded product of the sintering aid or an AlN ceramics containing the sintering aid can be used. Note that when the AlN structure according to the present invention is an AlN ceramics, the sintering aid can be added as needed when the AlN ceramics is sintered.

The manufacturing method of the present invention described above can be applied to an AlN structure according to the present invention partially having different transition metal contents or porosities. This application is based on the findings obtained by the extensive studies by the present inventors that the oxygen trapping substance has a function of trapping a transition metal such as Ti or Zr. In addition, the sintering aid used as the oxygen trapping substance is a component which becomes a liquid phase upon sintering to increase a density between AlN regions. In the manufacturing method of the present invention, therefore, by arbitrarily setting sintering conditions upon re-sintering, an AlN structure according to the present invention in which a porosity is small in a predetermined position can be realized.

The oxygen trapping substance as described above has a comparatively low trapping efficiency for Fe or the like of transition metals. According to the present invention, therefore, when a transition metal for which a trapping effect is low is contained in an AlN raw material, only an oxygen content or porosity can be changed at a predetermined position with almost no change in transition metal content.

In addition, the present inventors obtained the following findings as a result of the extensive studies using an oxygen trapping substance containing Y. That is, as oxygen is trapped in the oxygen trapping substance, a composition and a crystal structure of the oxygen trapping substance are changed. For example, when an oxygen trapping substance containing a compound having a composition represented by $2Y_2O_3 \cdot Al_2O_3$ is used, the composition is changed into $Y_2O_3 \cdot Al_2O_3$ and/or $3Y_2O_3 \cdot 5Al_2O_3$, and a crystal structure after cooled is changed into a perovskite and/or garnet. That is, as indicated by the above composition change, oxygen in AlN grains is trapped as alumina ($Al_2O_3$) by the oxygen trapping substance to increase the purity. If a compound represented by $3Y_2O_3 \cdot 5Al_2O_3$ is used as the trapping substance, trapping of $Al_2O_3$ reaches its limit, and an oxygen trapping effect becomes insignificant.

It was confirmed for an oxygen trapping substance containing another Ln element that the above phenomenon occurs, i.e., $Al_2O_3$ is trapped when a purity is increased to limit $Al_2O_3$ trapping. In addition, a composition used when $Al_2O_3$ was limited was either $3Ln_2O_3 \cdot 5Al_2O_3$ or $Ln_2O_3 \cdot 11Al_2O_3$. In $3Ln_2O_3 \cdot 5Al_2O_3$, an Ln element for limiting $Al_2O_3$ trapping was Y, Ho, Er, or the like. In $Ln_2O_3 \cdot 11Al_2O_3$, an Ln element for limiting $Al_2O_3$ trapping was La, Nd, Pr, or the like.

The present inventors examined an oxygen trapping substance containing an R element by using an oxygen trapping substance containing Ca. As a result, it was confirmed that a similar phenomenon occurred, i.e., $Al_2O_3$ was trapped when a purity was increased, and there was limit in the trapping. For example, when an oxygen trapping substance containing a compound having a composition represented by $3CaO \cdot Al_2O_3$ was used, the composition was changed into $12CaO \cdot 7Al_2O_3$ and/or $CaOAl_2O_3$. When the composition was changed into $CaO \cdot 6Al_2O_3$, trapping of $Al_2O_3$ was limited. That is, a composition which limits trapping of $Al_2O_3$ was $RO \cdot 6Al_2O_3$ in the case of the R element. When the R and Ln elements were mixed and contained in an oxygen trapping substance, a compound having a composition represented by $2RO \cdot Ln_2O_3 \cdot 3Al_2O_3$ limited trapping of $Al_2O_3$.

On the basis of the findings as described above, when a purity at a predetermined position of an AlN substrate (raw material) is increased by using at least one member selected from the group consisting of $RO \cdot 6Al_2O_3$, $3Ln_2O_3 \cdot 5Al_2O_3$, $Ln_2O_3 \cdot 11Al_2O_3$, and $2RO \cdot Ln_2O_3 \cdot 3Al_2O_3$ as a substance having a low oxygen trapping ability, the transition metal content or porosity can be changed with almost no change in oxygen content.

According to the manufacturing method as described above, a plurality of AlN regions having different oxygen contents, transition metal contents, or porosities are integrally formed to satisfy a predetermined positional relationship, and neighboring regions are brought into contact with each other to form an abrupt junction, thereby obtaining an AlN structure of the present invention. Therefore, an AlN structure consisting of a plurality of AlN regions having anisotropy in physical properties such as a thermal conductivity, a light transmittance, and a strength is realized.

FIGS. 3 and 4 show another method of manufacturing an AlN structure according to the present invention, in which AlN ceramics parts having different purities are integrated to satisfy a predetermined positional relationship.

In this method, a plurality of AlN ceramics parts having different purities or physical properties are sintered respectively, and the AlN ceramics part obtained are formed into predetermined shapes as needed. Thereafter, these members (in this embodiment shown in FIGS. 3 and 4, ceramics substrates 22, 24, and 26) are assembled as shown in FIG. 3 and re-sintered in a non-oxidizing atmosphere to be integrated as shown in FIG. 4.

In this manufacturing method, a sintering aid is preferably used to facilitate bonding of the AlN ceramics each other. The sintering aid becomes a liquid phase upon heating for the AlN ceramics bonding and located at a grain boundary of AlN after cooled.

In this case, the type of substance to be used as a sintering aid is important. A conventional effective example of a substance used to bond AlN ceramics is a known sintering aid to be added upon sintering of AlN ceramics, i.e., an R or Ln element compound. Such a compound, however, is a component used in an oxygen trapping substance according to the present invention as described above and therefore has a strong function of trapping oxygen in AlN grains to increase a purity of an AlN ceramics. Therefore, if the above compound is used upon bonding, a functional ceramics of the present invention may not be obtained since purities of the bonded AlN ceramics are changed.

In this method, the present inventors solved the above problem by using at least one member selected from the group consisting of $RO \cdot 6Al_2O_3$, $3Ln_2O_3 \cdot 5Al_2O_3$, $Ln_2O_3 \cdot 11Al_2O_3$, and $2RO \cdot Ln_2O_3 \cdot 3Al_2O_3$ as a sintering aid used to facilitate bonding. As described above, the above four types of the R and Ln element compounds have almost no oxygen trapping effect. Therefore, by using these compounds as a sintering aid, an AlN structure of the present invention can be realized without changing an oxygen content in AlN grains in AlN ceramics to be bonded. In addition, the above sintering aid is preferably used in a small amount in order not to change a transition element content of, e.g., Ti or Zr, a porosity, or the like in the A%N ceramics.

If no precise value is required for the oxygen content in AlN grains in the obtained AlN structure, the sintering aid for facilitating bonding is not limited to the above four types of compounds. For example, in order to manufacture the AlN structure according to the present invention in which AlN ceramics substrates having different transition element contents, porosities, or the like are integrated and the oxygen content in AlN grains is not particularly precisely determined, R or Ln element compounds can be widely used as the sintering aid.

As described above, when the R or Ln element compound is used as a sintering aid upon pre-sintering of AlN ceramics (in the embodiment shown FIGS. 3 and 4, ceramics substrates 22, 24, and 26), an R-Al-O-system compound, an Ln-Al-O-system compound, an Ln-R-Al-O-system compound, or the like may be contained as a residual component. If such a residual component is contained in at least one of the AlN ceramics to be bonded, no sintering aid need be used upon bonding of the AlN ceramics. In this case, the residual component is preferably at least one member selected from the group consisting of $RO \cdot 6Al_2O_3$, $3Ln_2O_3 \cdot 5Al_2O_3$, $Ln_2O_3 \cdot 11Al_2O_3$, and $2RO \cdot Ln_2O_3 \cdot 3Al_2O_3$. Therefore, when the AlN ceramics 22, 24, and 26 to be bonded to each other are to be presintered, an amount of the sintering aid to be added is preferably determined in consideration of an oxygen content in an AlN powder of a starting material so that the above compound is obtained as the residual component.

If sintering is performed at a high temperature for a long time period, the AlN ceramics as described above can be bonded without using any bonding substance. In this case, however, the purities of the AlN ceramics substrates to be bonded are changed with high possibility. Therefore, if precise values are required for physical properties of an AlN structure to be obtained, bonding is preferably performed by using a sintering aid.

In the above method of manufacturing the AlN structure of the present invention using bonding of AlN ceramics substrates having different purities, although the number of manufacturing steps is larger than that of the manufacturing method according to the present invention using an oxygen trapping substance, an AlN structure having a more complicated shape can be realized. In addition, AlN ceramics substrates can be bonded by hot pressing in accordance with the shape of the AlN ceramics substrates to be bonded.

In the AlN structure of the present invention as has been described in detail above, good properties of AlN are maximumly used. Therefore, this AlN structure is expected to be applied to a switching element or various types of circuits which can be used in very severe environments such as high temperatures or metal vapors.

The present invention will be described in detail below by way of its examples.

EXAMPLE 1

An AlN powder having an impurity oxygen amount of 1.6 wt %, a primary grain size of 0.6 $\mu$m, a lattice constant of an a axis of 3.11122 (4), that of a c axis of 4.98038 (9), and the c/a axis ratio of 1.60078 was sintered in a nitrogen atmosphere by hot pressing, thereby obtaining a disc-like AlN ceramics having a diameter of 100 mm and a thickness of 1.5 mm. Hot pressing was performed by charging the above AlN powder into a graphite press and pressing at a maximum temperature of 1,800° C. and a uniaxial pressure of 400 kg/cm² for one hour. The obtained ceramics was a grayish black light-shielding member which was satisfactorily dense to have a density of 3.264 b/cm³. Thermal conductivity of the AlN ceramics measured by a laser flash method was 75 w/m·k at room temperature (23° C. ±2° C.).

A microstructure of a fracture surface of the AlN ceramics was observed by using an SEM. As a result, many AlN grains were fractured in transgranular, and an average grain size of the grains calculated from an SEM image by an intercept method was 3.5/$\mu$m. According to X-ray diffraction, this AlN ceramics contained a small amount of AlON. Lattice constants of AlN of the ceramics were 3.11142 (2) and 4.97816 (7) for a and c axes, respectively, and its c/a axis ratio was 1.59996. Generally, when solution oxygen is contained in AlN, an a axis is elongated, a c axis is shortened, and a c/a axis ratio is decreased. Therefore, it was confirmed that solution oxygen was contained in AlN grains of the obtained AlN ceramics.

As shown in FIG. 5, the disc-like AlN ceramics 32 was equally divided into four pieces, and a paste-like oxygen trapping substance 34 consisting of a $2Y_2O_3 \cdot Al_2O_3$ powder and an organic solvent was coated on opposing two portions to have a thickness of 1 mm. Ethanol was used as the organic solvent. Thereafter, the above AlN ceramics was placed on an AlN base saggar so that the coated surface faced up, and the resultant structure was sintered in a graphite vessel in a nitrogen atmosphere at a pressure of 1 atm and a temperature of 1,850° C. for 20 hours, thereby manufacturing an AlN structure according to the present invention. In order to prevent bonding between the AlN ceramics and the AlN base saggar, a small amount of an h-BN powder was located between the AlN ceramics and the saggar.

After sintering, yttrium nitride (YN) was formed in the region on which the oxygen trapping substance was coated. YN immediately reacted with water vaper in the air and was decomposed to be removed from the AlN ceramics surface, and a portion immediately below YN had a light-transmitting property. A region on which no oxygen trapping substance was coated remained grayish black and had a light-shielding property, and the obtained AlN structure had anisotropy in a light transmittance. Lattice constants and thermal conductivity of the AlN structure were measured. AlN lattice constants in the region on which the oxygen trapping substance was coated were a axis =3.11109 (11) and c axis =4.98020, and its c/a axis ratio was 1.60079. AlN lattice constants of a region on which no oxygen trapping substance was coated were a axis =3.11138 (3) and c axis =4.97902 (8), and its c/a axis ratio was 1.60026. From these values, it was confirmed that the content of solution oxygen contained in AlN grains in the region on which the oxygen trapping substance was coated was less than that in the region on which no oxygen trapping substance was coated, i.e., a purity in this region was increased. The thermal conductivity in the region on which the oxygen trapping substance was coated was 150 w/m·k, while that in the region on which no oxygen trapping substance was coated was 81 w/m·k. That is, anisotropy was obtained in a thermal conductivity of the obtained functional ceramics. In addition, the obtained AlN structure had satisfactory heat and corrosion resistances and was not degraded but held its excellent physical properties even in a metal vapor at a high temperature.

EXAMPLE 2

5 wt % of a $Y_2O_3$ powder having a primary grain size of 0.2 /$\mu$m was added to an AlN powder having an impurity oxygen amount of 0.86 wt %, a primary grain size of 0.7/$\mu$m, a lattice constant of an a axis of 3.11134 (2), that of a c axis of 4.98049 (5), and the c/a axis ratio of 1.60075, and the resultant material was milled and mixed by using a ball mill, thereby preparing a raw material. After 7 wt % of an acryl-system binder were added to the above raw material to perform granulation, the resultant material was press-molded at a pressure of 500 kg/cm² form a 50×50×8 mm compact. Subsequently, the resultant compact was heated in a nitrogen atmosphere up to 700° C. to remove the acryl-system binder. The compact was then sintered in a carbon vessel in a nitrogen atmosphere at 1 atm and 1,850° C. for 96 hours to manufacture a first AlN ceramics. Upon sintering, the above compact was placed on an AlN base saggar, and a small amount of h-BN was located between the two members to prevent bonding.

The obtained first AlN ceramics had a thermal conductivity of 270 w/m·k at the room temperature, lattice constants of 3.11133 (5) and 4.98064 (12) for a and c axes, respectively, and the c/a axis ratio of 1.60081.

By using a similar AlN powder as a starting material, sintering was performing by hot pressing following the same procedures as in Example 1 to manufacture a 40×40×6.5 mm second AlN ceramics. The second AlN ceramics had a thermal conductivity of 81 w/m·k, lattice constants of 3.11150 (3) and 4.9876 (7) for a and c axes, respectively, and the c/a axis ratio of 1.60012. That is, the second AlN ceramics had smaller thermal conductivity and a higher oxygen content than those of the first AlN ceramics.

Each of the above AlN ceramics having different purities was formed into a 35×35×6 mm member. A paste-like sintering aid consisting of a $2CaO \cdot Y_2O_3 \cdot 3Al_2O_3$ powder and ethanol was coated on the surface surround by 35×6 mm of one AlN ceramics to have a thickness of 0.5 mm.

The AlN ceramics having different purities were combined via the coated surface and placed on an AlN base saggar on which a small amount of an h-BN powder was located. Sintering was performed in a nitrogen atmosphere at 1 atm and 1,800° C. for two hours. After sintering, the resultant ceramics was cut into a 70×35×0.5 mm piece to obtain an AlN structure according to the present invention. A bonding strength of the two AlN ceramics of the obtained AlN structure was excellent, and the AlN structure had excellent physical properties similar to those of the AlN structure obtained by Example 1.

EXAMPLE 3

5 wt % of a $3Y_2O_3 \cdot 5Al_2O_3$ powder having primary grain size of 0.9 μm and 0.2 wt % of a $TiO_2$ powder having a primary grain size of 1.1 μm were added to the AlN powder used in Example 2, and the resultant material was formed into a compact following the same procedures as in Example 2. The obtained compact was sintered in an h-BN vessel in a nitrogen atmosphere at 1 atm and 1,800° C. for one hour. The obtained third AlN ceramics was a slightly brownish black light-shielding member having a thermal conductivity of 90 w/m·k, lattice constants of 3.11145 (8) and 4.97960 (21) for a and c axes, respectively, and the c/a axis ratio of 1.60041. According to X-ray diffraction, this third AlN ceramics contained a slight amount of TiN in addition to $3Y_2O_3 \cdot 5Al_2O_3$.

Following the same procedures as in Example 2, the first AlN ceramics having a less oxygen content in AlN grains than that of the third AlN ceramics and not containing a transition metal was manufactured. The first AlN ceramics had a light-transmitting property and a higher thermal conductivity than that of the third AlN ceramics.

These AlN ceramics were bonded following the same procedures as in Example 2 to obtain an AlN structure according to the present invention. A bonding strength of the two AlN ceramics of the obtained AlN structure was excellent, and the AlN structure had excellent physical properties similar to those of the AlN structure obtained in Example 1.

EXAMPLE 4

6 wt % of $LaF_3$ powder having a primary grain size of 0.5 μm was added to the AlN powder used in Example 2 to form a compact following the same procedures as in Example 2. This compact was sintered in an h-BN vessel in a nitrogen atmosphere 1,850° C. for six hours. The obtained fourth AlN ceramics had a light transmittance and a thermal conductivity of 230 w/m·k, lattice constants of 3.11130 (5) and 4.98079 (13) for a and c axes, respectively, and the c/a axis ratio of 1.60087. According to X-ray diffraction, the fourth AlN ceramics contained $LaAlO_3$.

Following the same procedures as in Example 3, the third AlN ceramics containing a transition metal and having a high oxygen content was manufactured. The third AlN ceramics had a low thermal conductivity and a light-shielding property.

These AlN ceramics were bonded following the same procedures as in Example 2 to obtain an AlN structure according to the present invention. Note that bonding was performed by using a sintering aid consisting of $3Y_2O_3 \cdot 5Al_2O_3$ and ethanol. A bonding strength of the two AlN ceramics of the obtained AlN structure was excellent, and the AlN structure had superior physical properties similar to those of the AlN structure obtained in Example 1.

EXAMPLE 5

3 wt % of a $Y_2O_3$ powder having a primary grain size of 0.05 μm and a purity of 99.9% were added to the AlN powder used in Example 2 to form a compact following the same procedures as in Examples 2. This compact was sintered in an AlN saggar in a nitrogen atmosphere at 1 atm and 1,600° C. for 30 minutes. The obtained fifth AlN ceramics had a density of 2.426 g/cm$^3$, i.e., was not satisfactorily dense and had a high porosity. The fifth AlN ceramics had a thermal conductivity of 47 w/m·k, lattice constants of 3.11147 (10) and 4.97982 (16) for a and c axes, respectively, and the c/a axis ratio of 1.60047, and contained 1.2 wt % of $YAlO_3$ and 4.3 wt % of $2Y_2O_3 \cdot Al_2O_3$.

Following the same procedures as in Example 2, the first AlN ceramics was manufactured. This first AlN ceramics had a less oxygen content in AlN grains than that of the fifth AlN ceramics described above and a density of 3.261 g/cm$^3$, i.e., was satisfactorily dense.

Figure 6:
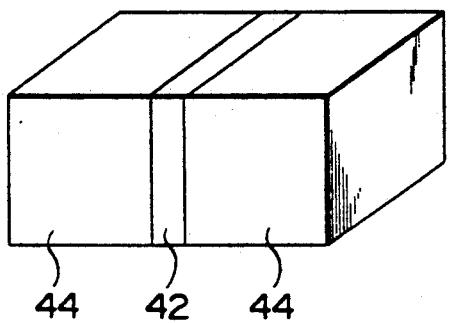
FIG. 6 is a perspective view showing another embodiment of an AlN structure according to the present invention.

As shown in FIG. 6, by using a 25×25×25 mm piece of the first AlN ceramics and a 25×25×5 mm piece of the fifth AlN ceramics, an AlN structure according to the present invention having a sandwiching structure in which the fifth AlN ceramics substrate 42 is sandwiched between two first AlN ceramics substrates 44 was manufactured. Upon bonding, no sintering aid was used since the fifth AlN ceramics contained an Ln-Al-O-system compound as described above. Sintering was performed at a uniaxial pressure of 50 kg/cm$^2$ in a nitrogen atmosphere at 1,600° C. for 30 minutes.

After sintering, the density at a central portion associated with the fifth AlN ceramics 42 was 2.881 g/cm$^3$, i.e., indicated that sintering progressed. Strength of the central portion, however, was 20±5 kg/cm$^2$ and that of end portions associated with the first AlN ceramics 44 was 35±5 kg/mm$^2$. That is the AlN structure according to this example had satisfactory anisotropy in a strength. A thermal conductivity of the end portions was 200 w/m·k or more, while that of the central portion was 87 w/m·k, i.e., this AlN structure had satisfactory anisotropy in thermal conductivity. The bonding strength of the two AlN ceramics substrates of the obtained AlN structure was excellent, and the AlN structure had superior physical properties similar to those of the AlN structure obtained in Example 1.

EXAMPLE 6

An AlN structure according to the present invention was manufactured following the same procedures as in Example 1 except that an oxygen trapping substance containing a component shown in Table 1 was used instead of $2Y_2O_3 \cdot Al_2O_3$. Table 1 shows lattice constants and a thermal conductivity of AlN obtained after a purity of a region on which the oxygen trapping substance shown in Table 1 was coated was increased. As is apparent from Table 1, in the region on which the oxygen trapping substance was coated, the thermal conductivity was increased to be 130 w/m·k or more, and the c/a axis ratio was 1.60070 or more. From these values, it was confirmed that in this AlN structure, AlN ceramics regions having different contents of solution oxygen in AlN grains were integrated and anisotropy was obtained in a thermal conductivity. In addition, the obtained AlN structure had satisfactory heat and corrosion resistances and was not degraded but held its excellent physical properties even in a metal vapor at a high temperature.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

TABLE 1

| Sample number | Component of Oxygen trapping substrate | Thermal conductivity (w/m.k) | AlN lattice constant | | |
|---|---|---|---|---|---|
| | | | a axis | c axis | c/a axis ratio |
| 1 | $Y_2O_3$ | 165 | 3.11120 | 4.98040 | 1.600080 |
| 2 | $CeO_2$ | 158 | 3.11125 | 4.98030 | 1.600074 |
| 3 | $La_2O_3$ | 162 | 3.11115 | 4.98045 | 1.600084 |
| 4 | $CaCO_3$ | 138 | 3.11116 | 4.98020 | 1.600075 |
| 5 | $2CaO \cdot Y_2O_3 \cdot Al_2O_3$ | 148 | 3.11108 | 4.98025 | 1.60081 |
| 6 | $YF_3$ | 165 | 3.11122 | 4.98043 | 1.60080 |
| 7 | $CaO \cdot Y_2O_3$ | 158 | 3.11118 | 4.98050 | 1.60084 |
| 8 | $Ca_2C$ | 138 | 3.11125 | 4.98022 | 1.60071 |
| 9 | $3CaO \cdot Al_2O_3$ | 139 | 3.11120 | 4.98020 | 1.60073 |

What is claimed is:

1. A method of manufacturing an aluminum nitride structure exhibiting anisotropic thermal conductivity, comprising the steps of:

sintering and forming a first member of aluminum nitride ceramic;

sintering and forming a second member of aluminum nitride ceramic, said first and second members differing in a property selected from the group consisting of concentration of solution oxygen, transition element content, and porosity;

combining the first and second members, thereby forming an intermediate structure; and sintering the intermediate structure so as to integrate the first and second members and form the aluminum nitride structure.

2. The method according to claim 1, wherein the first and second members differ in concentration of solution oxygen.

3. The method according to claim 1, wherein an aid of a material selected from the group consisting of $RO \cdot 6Al_2O_3$, $3Ln_2O_3 \cdot Al_2O_3$, $Ln_2O_3 \cdot 1Al_2O_3$, and $2RO \cdot Ln_2O_3 \cdot 3Al_2O_3$, wherein R represents at least one alkali element and Ln represents at least one element selected from the group consisting of yttrium and rare earth elements, is interposed between said first and second members and then the intermediate structure is sintered.

4. The method according to claim 2, wherein the first member contains a component of a material selected from the group consisting of $RO \cdot 6Al_2O_3$, $3Ln_2O_3 \cdot 5Al_2O_3$, $Ln_2O_3 \cdot 11Al_2O_3$, and $2RO \cdot Ln_2O_3 \cdot 3Al_2O_3$, wherein R represents at least one alkali element and Ln represents at least one element selected from the group consisting of yttrium and the rare earth elements.

5. A method of manufacturing an aluminum nitride structure having anisotropic light transmittance, comprising the steps of:

sintering and forming a first member of aluminum nitride ceramic;

sintering and forming a second member of aluminum nitride ceramic, said first and second members differing in transition element content;

combining the first and second members, thereby forming an intermediate structure; and sintering the intermediate structure so as to integrate the first and second members and form the aluminum nitride structure.

6. A method of manufacturing an aluminum nitride structure exhibiting anisotropic strength, comprising the steps of:

sintering and forming a first member of aluminum nitride ceramic;

sintering and forming a second member of aluminum nitride ceramic, said first and second members differing in porosity;

combining the first and second members, thereby forming an intermediate structure; and sintering the intermediate structure so as to integrate the first and second members and form the aluminum nitride structure.

* * * * *